Oct. 3, 1950 A. GARDE 2,524,222
SPEED CONTROL
Filed Aug. 11, 1949 2 Sheets-Sheet 1

Inventor
Aage Garde
By [signature]
Attorney.

Oct. 3, 1950 A. GARDE 2,524,222
SPEED CONTROL

Filed Aug. 11, 1949 2 Sheets-Sheet 2

Inventor
Aage Garde
By
Attorney.

Patented Oct. 3, 1950

2,524,222

UNITED STATES PATENT OFFICE 2,524,222

SPEED CONTROL

Aage Garde, Vasteras, Sweden, assignor to Allmanna Svenska Elektriska Aktiebolaget, Vasteras, Sweden, a Swedish corporation Application August 11, 1949, Serial No. 109,653
In Sweden August 12, 1948

2 Claims. (Cl. 172—284)

The present invention relates to control means for obtaining a speed regulation of a shaft or another rotatable element while driven over an electromagnetically controlled sliding clutch by a motor running with substantially constant speed, which speed regulation is relatively independent of the resistance of the load. The invention is especially useful in rolling machines and other machines having greatly varying load moment.

The main feature of the invention consists in that the energization of the sliding clutch is accomplished from a current source having substantially constant voltage connected in opposition to the voltage across a tachometer generator rotated by the driven shaft, and by means of a current blocking valve, such as a rectifier or a power directional relay, inserted in the excitation circuit of the sliding clutch.

Figure 1:
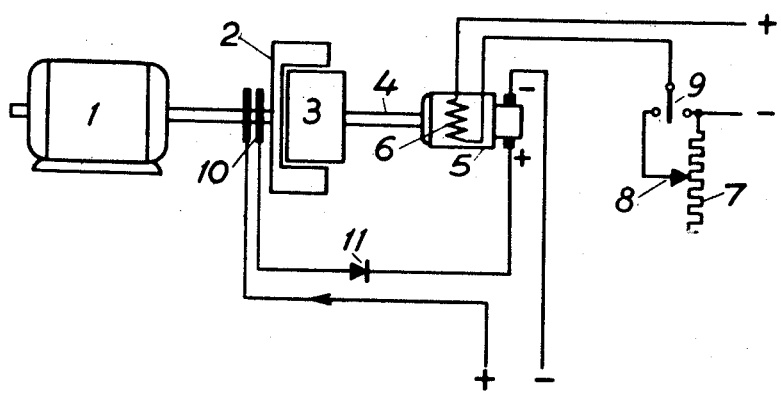
Figure 2:
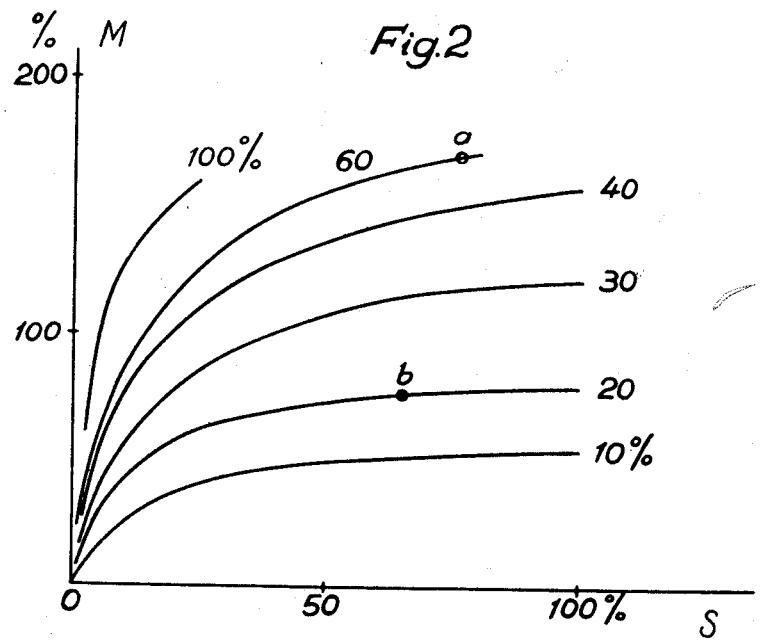
Figure 3:
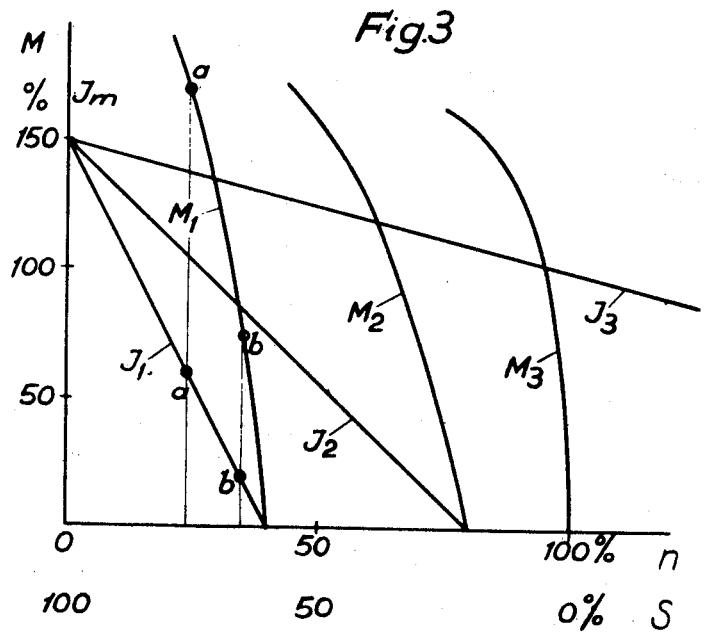

The invention will be described in connection with the accompanying drawing, wherein Fig. 1 shows a fundamental diagram of connections and Figs. 2 and 3 illustrate working curves obtained by the arrangement according to the invention.

Referring to the drawing, 1 designates the driving motor running with constant speed, 2 and 3 designate the two members of the sliding clutch, and 4 is the driven shaft to which the tachometer generator 5 is connected. The field 6 of said generator is energized from a direct current source over a rheostat 7 or a voltage divider. By means of the sliding contact 8 the energization of the tachometer generator may be set to any desired value, and by means of the double throw-over switch 9 said energization may be varied suddenly from this value to the highest possible value by bridging or disconnecting the resistance. The current is applied to the sliding clutch over slip rings 10, and in series with the tachometer generator between the same and the sliding clutch there is inserted a current blocking valve 11.

The results of the operation of the arrangement will be evident from the curves in Figs. 2 and 3, wherein Fig. 2 shows the torque M of the clutch as a function of the slippage S at different excitation conditions, the torque being indicated as ordinate and the slippage as abscissa. Fig. 3 shows partly the variation of the excitation current $I_m$ and partly the variations of the torque M in response to the slippage S and the speed $n$ of the shaft for different values of the energization of the tachometer generator.

As the voltage of the tachometer generator is zero i. e. during stop, the excitation current reaches its maximum value and thereafter it decreases to zero under increasing speed, i. e. decreasing slippage and will reach the value zero at that speed whereat the voltage of the tachometer generator becomes equal to the constant counteracting voltage. The current, however, cannot change the direction but it maintains the value zero under further increasing speed due to the interconnected blocking valve 11. The curves $J_1$, $J_2$, and $J_3$ therefore show the variations in the excitation current of the sliding clutch under different adjustments of the resistance 7. From the curves in Fig. 2 then the torque values corresponding to different slippage values may be obtained and the curves $M_1$, $M_2$ and $M_3$ in Fig. 3 therefore show torque curves corresponding to the curves $J_1$, $J_2$ and $J_3$, respectively. It is evident from these curves that at one and the same adjustment of the resistance 7 a great variation of the torque only gives a slight variation of the slippage, i. e. the number of revolutions of the driven shaft remains substantially constant independently of the load moment.

I claim as my invention:

1. Speed control means for the output shaft of a machine driven at substantially constant speed by a prime mover through the medium of an electro-magnetically operated slip clutch wherein the control is substantially independent of the torque of the machine, comprising a tachometer generator coupled with the driven member of said clutch and with said shaft for energizing the exciter coil of said clutch, an electric source for supplying exciting current to said generator, regulating means for said exciting current, another electric source of substantially constant voltage for supplying exciting current to said exciter coil opposite the former exciting current, and current blocking means within the circuit of said latter source.

2. Speed transmission and control means for a shaft, comprising of prime mover, and electromagnetically operated slip clutch actuated by said prime mover and imparting motion to said shaft, a tachometer generator coupled with said shaft and energizing the exciter coil of said clutch, an electric source supplying exciting current to said generator, regulating means for said exciting current, another electric source of substantially constant voltage supplying exciting current to said exciter coil in opposition to the former exciting current, and current blocking means within the circuit of the latter source.

AAGE GARDE.

REFERENCES CITED

The following references are of record in the file of this patent:

UNITED STATES PATENTS

| Number | Name | Date |
|---|---|---|
| 2,277,284 | Winther | Mar. 24, 1942 |
| 2,447,654 | Kenyon | Aug. 24, 1948 |
| 2,449,779 | Jaeschke | Sept. 21, 1948 |